United States Patent [19]

Testone

[11] 4,428,230

[45] Jan. 31, 1984

[54] FLOW GAUGE IONIZER

[75] Inventor: Anthony Q. Testone, Lee, Mass.

[73] Assignee: Static, Inc., Skippack, Pa.

[21] Appl. No.: 258,307

[22] Filed: Apr. 28, 1981

[51] Int. Cl.³ .......................... G01F 1/22; G01F 15/00
[52] U.S. Cl. .................................... 73/198; 73/861.55
[58] Field of Search ................. 73/198, 861.55, 861.57; 34/36, 60; 250/432, 435, 324, 226

[56] References Cited

U.S. PATENT DOCUMENTS

| | | | |
|---|---|---|---|
| 3,416,370 | 12/1968 | Kaucher et al. | 73/861.55 |
| 3,875,309 | 10/1974 | Helm | 250/432 X |
| 3,956,933 | 5/1976 | Metzger | 73/861.55 |
| 3,974,857 | 8/1976 | Hehl | 73/861.55 |
| 4,163,389 | 8/1979 | Suzuki | 73/861.09 |
| 4,188,530 | 2/1980 | Miller | 250/324 |

Primary Examiner—Herbert Goldstein
Attorney, Agent, or Firm—Irvin A. Lavine

[57] ABSTRACT

A gas volume flow gauge is provided with apparatus to ionize the gas being discharged. The gauge has an adjusting valve and a float in a vertical gas passage to indicate the flow rate; an ionizing point is provided in the gas outlet passage, and is capacitively coupled to a conductor connected to an alternating current source. A grounded conductive ring surrounds the ionizing point.

8 Claims, 7 Drawing Figures

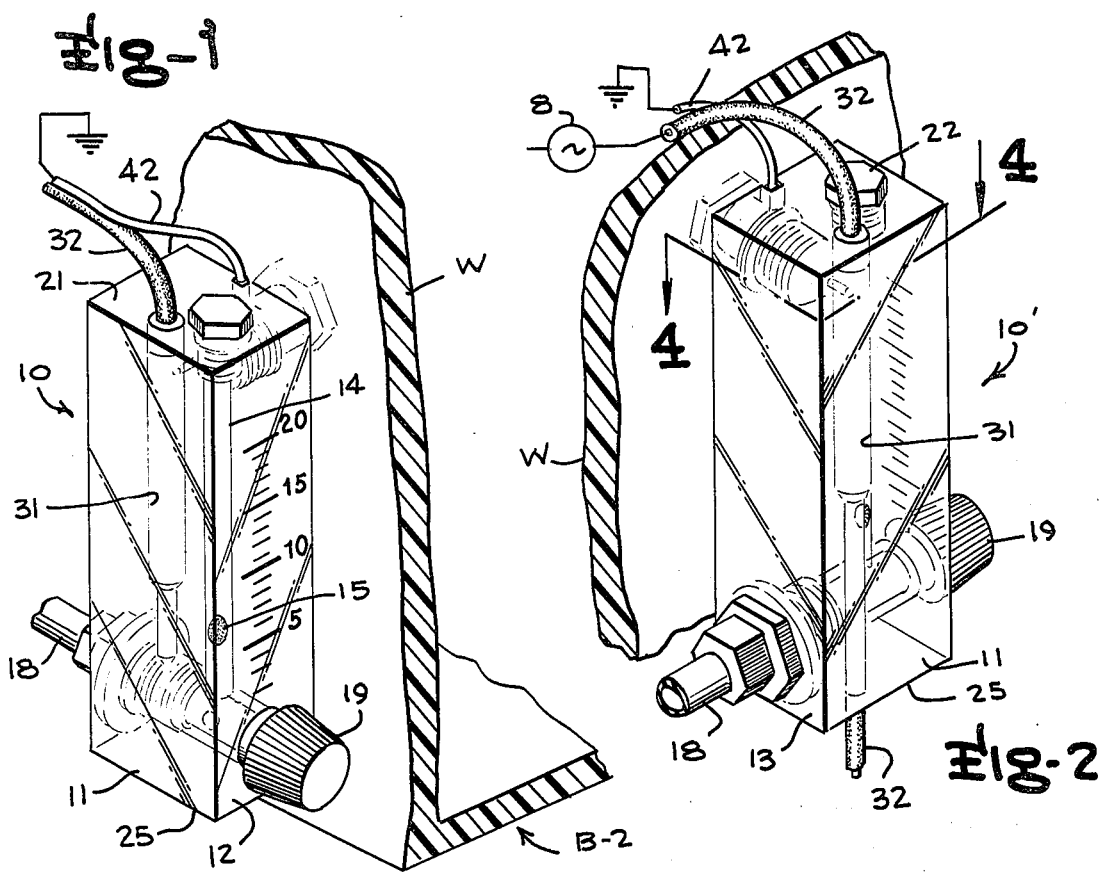

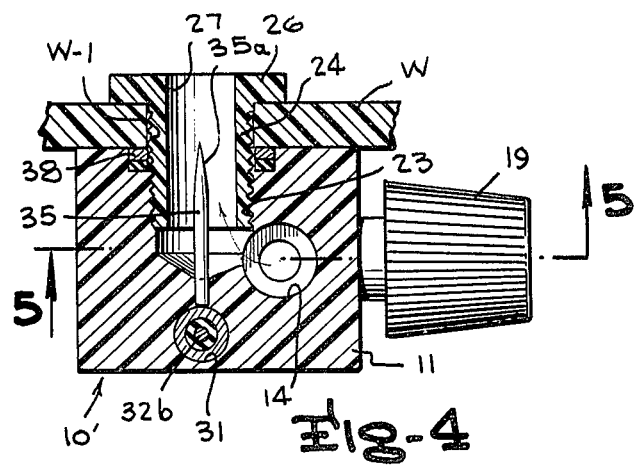
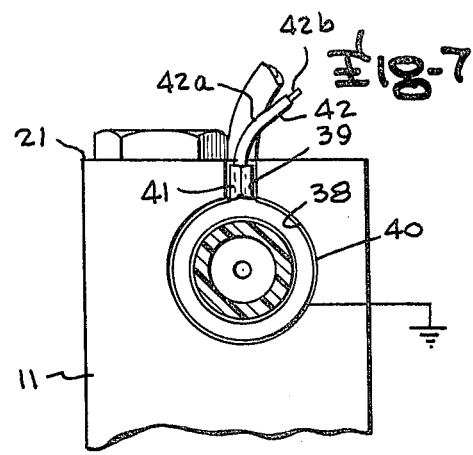
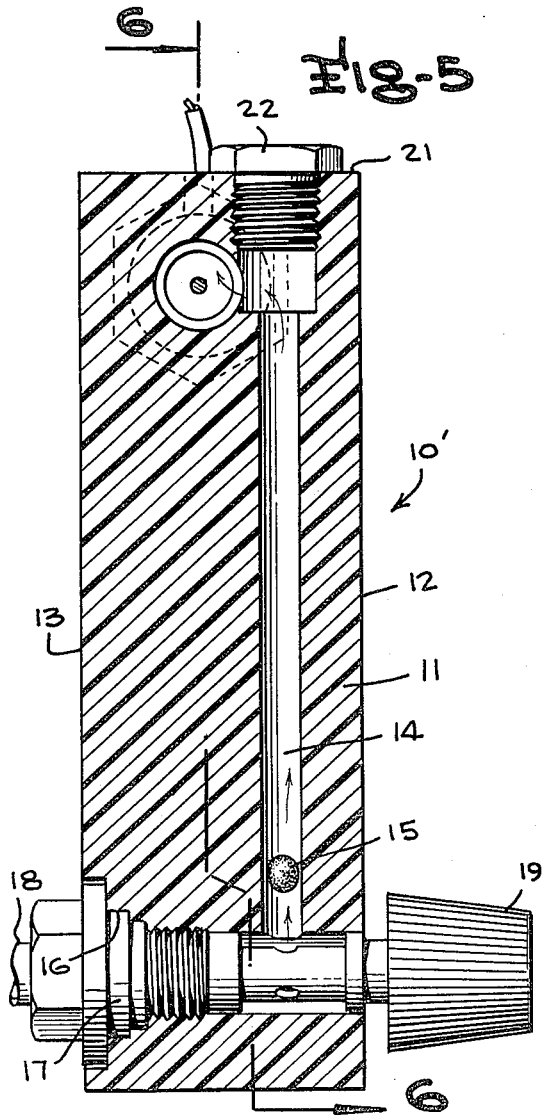
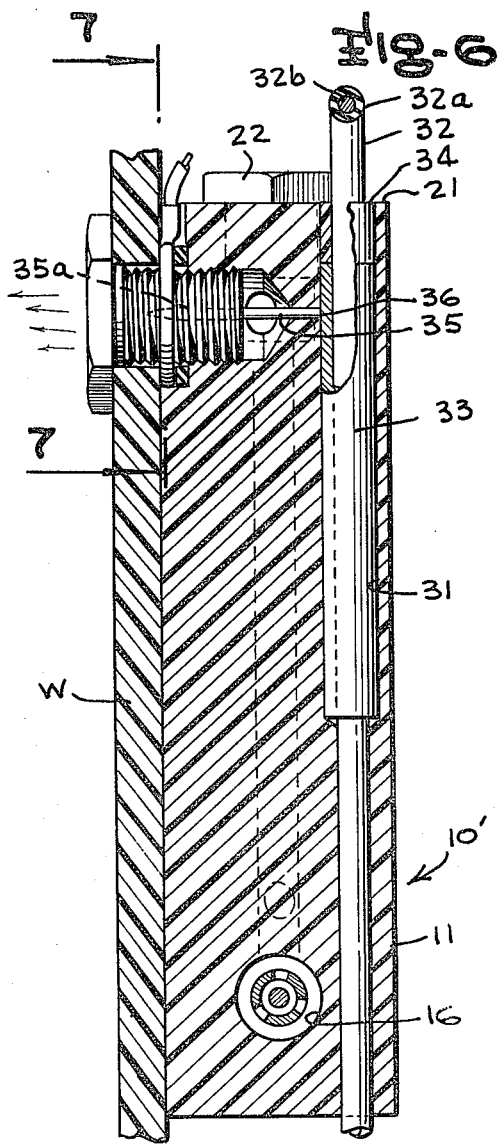

FLOW GAUGE IONIZER

BACKGROUND OF THE INVENTION

The present invention relates to a combined flow gauge and ionizer for use with dessicator boxes and the like, for the manufacture of integrated circuit devices.

During the manufacture of integrated circuit devices, certain portions of the circuitry which has been deposited on an insulating chip, such as of silicone, are connected to contact elements known as "dual inline plugs", which has connectors which enable the integrated circuit chip to be connected to a circuit board. The process involves bonding gold wire between portions of the integrated circuit and the dual inline plug. The dual inline plug is covered and then sealed, but prior to these steps, there must be a purge of the integrated circuit chips to remove any contamination, including moisture. This purging is effected by placing the integrated circuit chips in a container which is then flooded with nitrogen gas.

Considering that a contaminant may be any extraneous matter which has a harmful effect upon the end product, not only are the presence of moisture and particles of material contaminants of the integrated circuit chips, but also static electricity may be so designated, for the reason that static electricity is known to damage the end product, to the extent that it will not pass the require tests.

During the processing of the integrated circuit chips, which may include C/MOS, MOS/FET and other devices, it is the present practice to load the integrated circuit chips onto trays, which are then slid into boxes of transparent plastic material, after which nitrogen gas in introduced into the boxes, so as to flood or immerse the devices in the nitrogen to thereby eliminate any unwanted moisture. Since static electricity is a problem in connection with the manufacture of these integrated circuit chips, in some instances, some precaution has been taken through the utilization of an ionizing nozzle, to introduce ions, which would engage the trays, boxes and integrated circuit chips, and neutralize static electricity. A known practice was to mount the flow gauge so its main passage would be vertical, connect the discharge of the flow to an ion generator, and connect the ion generator to the dessicator box. The utilization of such organizations has been found to be cumbersome in organization and utilization.

SUMMARY OF THE INVENTION

The present invention is directed to apparatus for introducing a variable, regulated quantity of ionized nitrogen gas into a space, and more particularly for introducing such gas into a dessicator box used in the production of integrated circuit devices.

There is provided a flow gauge, and in combination therewith, an ion generator. The flow gauge, of known construction per se, comprises a body of clear plastic material having a vertical passage with a float therein, a control valve for controllably varying the quantity of gas passing to said vertical passage, markings on the body to serve as an indicator of the position of the float, and therefore of the flow rate, and an outlet passage. An ion generator is provided which comprises an insulated conductor extending into a bore of the gauge body, the insulator having a conductive sleeve surrounding it. An ionizing point has an end engaging the sleeve, and extends in the outlet passage, with a ring in surrounding relationship to the outer sharp end of the ionizing point; the ring is conductive and is connected to ground, while the insulated conductor is connected to a source of alternating current.

Among the objects of the present invention are the provision of an apparatus for removing contaminants, such as moisture and static electricity, by introducing ionized nitrogen gas into a space, such as one or more dessicator boxes, to thereby eliminate moisture and static electricity which may be present in or around integrated circuit chips contained within the dessicator box or boxes. A still further object is to provide an apparatus which will simultaneously introduce a regulated quantity of nitrogen gas and ion into a dessicator box. Yet another objective of the present invention is the provision of such an apparatus which will be efficient in operation, economical to manufacture, and easy to install and use.

Other objects and many of the attendant advantages of the present invention will be readily understood from the following drawings, specification, and claims.

BRIEF DESCRIPTION OF THE DRAWINGS

FIG. 1 is a perspective view of a combined flow gauge and ionizer, and a portion of a dessicator box, with parts removed.

FIG. 2 is a perspective view of an alternate embodiment, thereof.

FIG. 3 shows a stack of dessicator boxes, and combined flow gauges and generators of different embodiments associated therewith.

FIG. 4 is a cross-sectional view taken on the line 4—4 of FIG. 2.

FIG. 5 is a cross-sectional view taken on the line 5—5 of FIG. 4.

FIG. 6 is a cross-sectional view taken on the line 6—6 of FIG. 5.

FIG. 7 is a cross-sectional view taken on the line 7—7 of FIG. 6.

DESCRIPTION OF THE PREFERRED EMBODIMENTS

Referring now to the drawings, wherein like or corresponding reference numerals are used to designate like or corresponding parts, throughout the several views, there is shown in FIG. 1 a wall of a dessicator box. Associated with the wall is a combined gas volume flow gauge and ion generator, generally designated 10. The combined gauge and generator comprises a body 11 of clear plastic material, such as acrylic plastic. The body 11 is of parallelpiepedal shape, having a front face 12 on which are provided numerals, and opposite the front face 12, there is a rear face 13. A vertical flow passage 13 extends in the body 11 generally parallel and intermediate the front and rear faces 12 and 13, the passage 14 containing a float 15. At the bottom of the vertical passage 14 (see FIG. 5) there is a shouldered bore 16 extending from the rear face 13 to the front face 12, and containing an adjustable valve 17 to which there is connected an inlet pipe 18. A control knob 19 is connected with and forms a part of the valve 17, and extends beyond the front face 12 of the body 11. The vertical passage 14 extends to the upper face 21 of the body 11, and is closed by a screw threaded cap 22. Thus, gas will pass through the inlet pipe 18, the valve 17, and then flow upwardly through the passage 14, raising the float 15 in accordance with the volume of gas which is permitted to pass through operation of the control knob 19.

Referring to FIG. 4, there may be seen the vertical passage 14, and a horizontal outlet passage 23 which intersects with it, so that gas flowing upwardly through passage 14 enters into the horizontal outlet passage 23. Passage 23 is threaded and receives therein a portion of a threaded bolt 24 having a clamping flange 26 on its outer end, and an axial discharge passage 27 therethrough for the discharge of gas which has passed through the vertical passage 14.

The flange 26 of the bolt 24 engages a surface of the wall, the opposite surface of which engages a surface of the body 11, so that the threaded connection of the bolt 24 with the body 11 thereby serves to clamp the body 11 to the wall, it being noted that the wall has a passage W-1 for receiving the bolt 24.

Also shown in FIG. 4 is a vertical bore 31, which is rearwardly of the outlet passage 23. Bore 31 is shown in FIG. 6 as being of stepped configuration, and extends completely through the nonconductive plastic body 11. An insulated conductor 32 extends in the bore 31, and includes an insulating sheath 32a, within which is a linear conductor 32b. In surrounding relationship to the insulated conductor 32 is a conductive sleeve 33, which has its lower end approximately midway between the top and the bottom of the body 11, and which has its upper end spaced downwardly from the upper face 21 of body 11. A non-conductive sleeve 34 extends between the upper face 21 of body 11 and the upper end of the conductive sleeve 33, so as to prevent accidental contact of a person with the conductive sleeve 33. As shown in FIGS. 4 and 6, a conductive ionizing point 35 has its inner end in engagement with conductive sleeve 33, ionizing point 35 extending in the outlet passage 23 and within the bolt 24, terminating in a sharp outer point 35a. Ionizing point 35 is supported by the wall of an extention bore 36 which is coaxial with the outlet passage 23, and extends to the bore 31.

In surrounding relationship to the bolt 24 there is provided an annular recess 38 in the body 11. Recess 38 is also shown in FIG. 7 and has a vertically extending channel 39 connected to it, channel 39 extending to the upper face 21 of the body 11. A ring 40 of conducting material is placed in the recess 38, and has an extention 41 in the channel 39. An insulated conductor 42 having an insulating sheath 42a and a conductive wire 42b is connected to the ring 40, the conductive wire 42b being connected to ground. The sharp point 35a of ionizing point 35 is substantially in the plane of ring 40.

Referring again to FIG. 1 the insulated conductors 32 and 42 will be seen entering into the body 11 of the combined gauge and generator 10' through the upper face 21 thereof. The bore 31 will be seen to terminae upwardly of the bottom surface 25 of the insulating plastic body 11; the bore 31, in this embodiment is therefore a blind bore. In FIG. 2, however, it will be seen that the bore 31 of combined gauge and generator 10 extends completely through the body 11, to the bottom face 25, and it will further be seen that the conductor 32 extends completely through the body 11, passing through the bottom face 25 therefore.

In FIG. 3, there is shown a stack of dessicator boxes B-1, B-2, B-3. Each of the dessicator boxes B-1, B-2 has a combined gauge and ion generator 10 or 10' secured to a wall thereof. The combined gauge and ion generator 10' shown associated with desocated box B-1 has the insulated conductor 32 extending through it, but the combined gauge and ion generator 10 does not, since the bore 31 is a blind bore.

The insulated conductor 32 may be connected with a suitable source of alternating current, and thus that single source of alternating current may supply two of the combination gauge and ion generators, such as 10 and 10'. As shown in FIG. 3, a grounding insulating conductor 42 may be branched, with one portion extending to the conductive ring 40 of the combined gauge and ion generator 10, and the other branch extending to the combined gauge and ion generator 10'.

In operation, the integrated circuit chips are loaded into trays, and the trays are placed in the dessicator boxes, such as B-1, B-2, shown in FIG. 3. The control knobs 19 are rotated to permit the introduction of nitrogen gas through the inlet conduit 18, and the rate of flow of the nitrogen gas is observed by the position of the float 15 in relation to the markings on the face 14, and the desired nitrogen gas flow rate is established by the setting of the valve 17. The nitrogen will pass upwardly through the vertical passage 14 and thence into the discharge passage 23 and the discharge passage 27 in the bolt 24.

A switch (not shown) is closed to connect the insulated conductor 32 with a source of alternating current of known construction. Due to the conductive sleeve 33, the ionizing point 35 will be capacitively coupled to the alternating current source, and due to the presence of the ground ring 40, there will be generated possitive and negative ions in the nitrogen gas discharging from the passage 27. Thus, a controlled volume of nitrogen gas, containing positive and negative ions, will be discharged into the confined space within the dessicator box B-1, B-2 and as a result, the integrated circuit chips will be freed of both moisture and static electricity contaminants.

It will be obvious to those skilled in the art that various changes may be made without departing from the spirit of the invention, and therefore the invention is not limited to what is shown in the drawings and described in the specification but only as indicated in the appended claims.

I claim:
1. In combination,
 (a) a gas volume flow gauge comprising:
  (i) a body,
  (ii) gas passage means in said body comprising a bore providing a substantially vertical passage,
  (iii) means for indicating the gas volume flow rate including a float in said substantially vertical passage,
  (iv) means for varying the gas volume flow rate, and
 (b) means for ionizing gas passing from said gauge comprising ionizing point means in said gas passage means, means for supplying alternating current to said ionizing point means comprising a conductor adapted to be connected to a source of alternating current, a second bore in said body, said conductor being in said second bore, means carried by said body for coupling said point means to said conductor, conductive means carried by said body in adjacent spaced relationship to said ionizing point means, and means for connecting said conductive means to ground.
2. The combination of claim 1, said second bore in said body extending substantially parallel to said first mentioned bore.

3. The combination of claim 1, said body being nonconductive, said gas passage means comprising an outlet passage in said body, and said ionizing point means comprising an ionizing point having an outer sharp end in said passage.

4. The combination of claim 3, said outlet passage extending to a face of said body, said conductive means comprising a ring on said face in surrounding relationship to said outlet passage and to said outer sharp end of said ionizing point.

5. The combination of claim 1, said means for coupling said means to said conductor comprising insulating means surrounding said conductor, conductive means in said second bore surrounding said insulating means, and said ionizing point means engaging said surrounding conductive means.

6. The combination of claim 1, and further comprising a second gauge having a nonconductive body, gas passage means therein comprising a substantially vertical gas passage, means for indicating gas volume flow rate including a float in said gas passage, means in said second gauge body for ionizing gas passing from said second gauge, a bore in said body of said second gauge, said linear conductor also extending in the bore of said second gauge.

7. The combination of claim 1, and further comprising a container having a wall, an opening in said wall, and means for mounting said body on said wall for discharge of gas from said gauge into said container through said opening.

8. The combination of claim 7, said passage means including a threaded outlet passage, said mounting means comprising a clamping bolt extending through said opening and having a passage therein, threads on said bolt engaging said threaded outlet passage, and said ionizing means comprising an ionizing point extending into said outlet passage.

* * * * *